(12) United States Patent
Dawoud et al.

(10) Patent No.: US 10,970,372 B2
(45) Date of Patent: Apr. 6, 2021

(54) REVOCABLE BIOMETRIC PRINT BASED IDENTIFICATION

(71) Applicant: Microsoft Technology Licensing, LLC, Redmond, WA (US)

(72) Inventors: Peter Dawoud Shenouda Dawoud, Bothell, WA (US); Rachel Peters, Seattle, WA (US); Jinyu Li, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 236 days.

(21) Appl. No.: 16/178,339

(22) Filed: Nov. 1, 2018

(65) Prior Publication Data
US 2020/0143021 A1   May 7, 2020

(51) Int. Cl.
| | |
|---|---|
| *G06F 21/32* | (2013.01) |
| *H04L 9/06* | (2006.01) |
| *H04L 9/30* | (2006.01) |
| *H04L 9/32* | (2006.01) |
| *G06K 9/00* | (2006.01) |

(52) U.S. Cl.
CPC ............ *G06F 21/32* (2013.01); *H04L 9/0643* (2013.01); *H04L 9/30* (2013.01); *H04L 9/3247* (2013.01); *G06K 9/00288* (2013.01); *G06K 9/00926* (2013.01); *H04L 2209/38* (2013.01)

(58) Field of Classification Search
None
See application file for complete search history.

(56) References Cited

U.S. PATENT DOCUMENTS

| | | |
|---|---|---|
| 7,353,396 B2 | 4/2008 | Micali et al. |
| 7,602,910 B2 | 10/2009 | Johansson et al. |

(Continued)

FOREIGN PATENT DOCUMENTS

| | | |
|---|---|---|
| WO | 2018046009 A1 | 3/2018 |

OTHER PUBLICATIONS

Boult, "Robust Distance Measures for Face-Recognition Supporting Revocable Biometric Tokens", 7th International Conference on Automatic Face and Gesture Recognition, Apr. 2006, pp. 1-7. (Year: 2006).*

(Continued)

*Primary Examiner* — Benjamin E Lanier
(74) *Attorney, Agent, or Firm* — Workman Nydegger (57) ABSTRACT

The use of user-specific data to process a biometric print, such that use of the biometric print is revoked by invalidating the user-specific data. The processed print is generated by performing one-way processing of the biometric print using the user-specific data. The processed print, not the biometric print, is then provided to the authentication system for later authentication of the user. During matching, the user later provides a current biometric, resulting in generation of a current biometric print. For each of multiple users, the user-specific is obtained for that user, and at least one processed print is generated for each user based on the current biometric print. The current processed prints are used by the authentication system to match against each of the enrolled processed prints. If a match is found, the user is identified as being the user associated with the matching enrolled print.

20 Claims, 8 Drawing Sheets

(56) References Cited

U.S. PATENT DOCUMENTS

| | | | |
|---|---|---|---|
| 7,886,345 | B2 | 2/2011 | Kaliski et al. |
| 8,578,166 | B2 | 11/2013 | De Monseignat et al. |
| 8,683,564 | B2 | 3/2014 | Khan et al. |
| 8,788,837 | B2 | 7/2014 | Busch et al. |
| 9,055,061 | B2 | 6/2015 | Israel |
| 9,208,335 | B2 | 12/2015 | Wu et al. |
| 9,374,368 | B1 | 6/2016 | Roth et al. |
| 9,521,132 | B2 | 12/2016 | Harwood et al. |
| 9,697,340 | B2 | 7/2017 | Child |
| 10,015,163 | B2 | 7/2018 | Shelton |
| 2003/0099381 | A1* | 5/2003 | Ohba ............. G06K 9/00087 382/124 |
| 2004/0059924 | A1* | 3/2004 | Soto ................. G06F 21/32 713/186 |
| 2008/0052526 | A1* | 2/2008 | Dailey ............... G06F 21/32 713/186 |
| 2012/0131350 | A1* | 5/2012 | Atherton ........... H04L 9/3231 713/186 |
| 2016/0342782 | A1* | 11/2016 | Mullins ............. G06F 21/32 |
| 2017/0083750 | A1* | 3/2017 | Chin ................ G06K 9/0002 |
| 2017/0085562 | A1* | 3/2017 | Schultz ........... G06K 9/00093 |
| 2017/0250972 | A1 | 8/2017 | Ronda et al. |
| 2017/0316497 | A1* | 11/2017 | Song ................ G06Q 20/4014 |
| 2018/0137512 | A1 | 5/2018 | Georgiadis et al. |

OTHER PUBLICATIONS

Belguechi, et al., "Cancelable Authentication Based on Fingerprints Texture", In Proceedings of International Congress on Models, Optimization, and Security of Systems, May 2010, 9 Pages.

Choudhury, et al., "A Survey on Biometrics and Cancelable Biometrics Systems", In International Journal of Image and Graphics, vol. 18, No. 01, Jan. 25, 2018, 40 Pages.

Higham, Lori, "Best Practices of Big Data Analytics Applied to PII Security", In Thesis in the Field of Information Technology for the Degree of Master of Liberal Arts in Extension Studies, Harvard University, Nov. 2016, 69 Pages.

Lacharme, et al., "PIN-based Cancelable Biometrics", In International Journal of Automated Identification Technology, vol. 3, Issue 2, 2011, 09 Pages.

Mead, Karen Talley., "Emerging Biometric Technology: Revocable Biometric Features", Retrieved from: https://devtechnology.com/2013/11/emerging-biometric-technology-revocable-biometric-features/, Nov. 7, 2013, 03 Pages.

Page, Thomas, "The Application of Hash Chains and Hash Structures to Cryptograph", In thesis submitted for the degree of Doctor of Philosophy, Royal Holloway, University of London, Jul. 27, 2009, 233 Pages.

Patel, et al., "Cancelable Biometrics: A review", In Journal of IEEE Signal Processing Magazine, vol. 32, Issue 5, Sep. 2015, pp. 54-65.

"International Search Report and Written Opinion Issued in PCT Application No. PCT/US2019/58587", dated Jan. 28, 2020, 30 Pages.

* cited by examiner

REVOCABLE BIOMETRIC PRINT BASED IDENTIFICATION

BACKGROUND

Biometrics are measurements of physiological characteristics of a living entity, most often a human being. Biometrics are often used for purposes of identifying a human being and/or controlling access of human beings to resources. For instance, biometrics may include fingerprints, facial features, palm vein patterns, hand geometries, iris patterns, retina patterns, and so forth. In order to be used by a computing system, the appropriate biometric is converted into computer-readable code, which is often referred to as a "biometric print."

For instance, many mobile devices have a fingerprint scanner that allows a human user to enroll fingerprints (e.g., one fingerprint per finger) for purposes of later access to that mobile phone. Those fingerprints are stored on the mobile device as a set of biometric prints, one biometric print for each enrolled fingerprint. Later, if the user desires to unlock the mobile device or use restricted features of the mobile device, the user may rescan one of their enrolled fingers, which is matched against the enrolled fingerprints. Such fingerprint rescanning is an alternative to other forms of gaining access to the mobile device, such as perhaps entering a passcode.

Matching occurs by converting the rescanned fingerprint into a new biometric print. That new biometric print is then compared with each of the enrolled biometric prints until a sufficiently similar enrolled biometric print is found, or until all enrolled biometric prints are checked with no match. If a matching enrolled biometric print is found, the mobile device unlocks itself and/or enables the restricted features of the mobile device.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The principles described herein permit a user to revoke a biometric print, which is computer-readable code that represents a biometric (e.g., a fingerprint) of that user. Traditionally, given a knowledge of the processing used to compute a biometric print from a biometric, the same sample biometric will always result in the same biometric print. This means once a biometric print is known, there is no way to reissue a replacement biometric print for the user. In contrast, the principles described herein allows the biometric print to be revoked.

The use of biometrics to authenticate includes two phases: an enrollment phase and a later matching phase. In the enrollment phase, a user and his/her biometric data are enrolled in the authentication system. This enrolled biometric data will be used in future matching phases when determining that biometrics are from that same user. In the matching phase, a user provides a current biometric, which is used to generated current biometric data (also called herein a "processed print"), that the authentication system may use to authenticate through matching that current biometric data with the enrolled biometric data.

In accordance with the principles described herein, enrollment occurs by generating a processed print based on at least two pieces of information. First, there is the biometric print that is to be enrolled. Second, there is user-specific data that is, or that corresponds to, user-specific data that is recognized by the authentication system as being associated with the user. The processed print is generated by performing one-way processing of the biometric print using the user-specific data. One-way processing is processing from which the original inputs of the processing cannot be derived from the outputs. An example is hashing an input, or signing an input with a private key.

As a first example, the user-specific data may be a hash salt for the user, and the one-way processing may be hashing (perhaps chain-hashing) of the biometric print along with the salt hash of the user. As a second example, the user-specific data may be a private key of a public/private key pair associated with the user. In this second example, the one-way processing includes digitally signing the biometric print (or a hashed or perhaps chain-hashed version of the biometric print) use the private key. The authentication system has access to the public key of the public/private key pair and thus may verify that the user signed using the corresponding private key.

The processed print, but not the biometric print, is then provided to the authentication system for later authentication of the user using the processed print and the user-specific data that is recognized by the authentication system as being associated with the user. Thus, anyone looking at the communication channel with the authentication system will not discover the actual biometric print.

The processed biometric may be revoked by invalidating the user-specific data. For instance, the hash salt of the user may be revoked, or the public/private key pair may be invalidated. This means that any processed print generated from the biometric print will not be honored so long as the processed print was also generated using the invalidated user-specific data.

During matching, the user later provides a current biometric (e.g., a fingerprint of an enrolled finger), resulting in generation of a current biometric print. For each of multiple users, the user-specific is obtained for that user, and at least one processed print is generated for each user based on the current biometric print. The processed prints are used by the authentication system to match the provided current processed prints against each of the enrolled processed prints. If a match is found, the user is identified as being the user associated with the matching enrolled processed print.

Some embodiments described herein also prevent replaying of biometric prints. Thus, even if another party gains improper access to that biometric print, that user will not be able to use that biometric print to pretend they are the user when using that biometric print to authenticate to the authentication system. In accordance with at least some of those embodiments, this is accomplished by having the one-way processing include chain-hashing.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

The principles described herein permit a user to revoke a biometric print, which is computer-readable code that represents a biometric (e.g., a fingerprint) of that user. Traditionally, given a knowledge of the processing used to compute a biometric print from a biometric, the same sample biometric will always result in the same biometric print. This means once a biometric print is known, there is no way to reissue a replacement biometric print for the user. In contrast, the principles described herein allows the biometric print to be revoked.

The use of biometrics to authenticate includes two phases: an enrollment phase and a later matching phase. In the enrollment phase, a user and his/her biometric data are enrolled in the authentication system. This enrolled biometric data will be used in future matching phases when determining that biometrics are from that same user. In the matching phase, a user provides a current biometric, which is used to generated current biometric data (also called herein a "processed print"), that the authentication system may use to authenticate through matching that current biometric data with the enrolled biometric data.

In accordance with the principles described herein, enrollment occurs by generating a processed print based on at least two pieces of information. First, there is the biometric print that is to be enrolled. Second, there is user-specific data that is, or that corresponds to, user-specific data that is recognized by the authentication system as being associated with the user. The processed print is generated by performing one-way processing of the biometric print using the user-specific data. One-way processing is processing from which the original inputs of the processing cannot be derived from the outputs. An example is hashing an input, or signing an input with a private key.

As a first example, the user-specific data may be a hash salt for the user, and the one-way processing may be hashing (perhaps chain-hashing) of the biometric print along with the salt hash of the user. As a second example, the user-specific data may be a private key of a public/private key pair associated with the user. In this second example, the one-way processing includes digitally signing the biometric print (or a hashed or perhaps chain-hashed version of the biometric print) use the private key. The authentication system has access to the public key of the public/private key pair and thus may verify that the user signed using the corresponding private key.

The processed print, but not the biometric print, is then provided to the authentication system for later authentication of the user using the processed print and the user-specific data that is recognized by the authentication system as being associated with the user. Thus, anyone looking at the communication channel with the authentication system will not discover the actual biometric print.

The processed biometric may be revoked by invalidating the user-specific data. For instance, the hash salt of the user may be revoked, or the public/private key pair may be invalidated. This means that any processed print generated from the biometric print will not be honored so long as the processed print was also generated using the invalidated user-specific data.

During matching, the user later provides a current biometric (e.g., a fingerprint of an enrolled finger), resulting in generation of a current biometric print. For each of multiple users, the user-specific is obtained for that user, and at least one processed print is generated for each user based on the current biometric print. The processed prints are used by the authentication system to match the provided current processed prints against each of the enrolled processed prints. If a match is found, the user is identified as being the user associated with the matching enrolled processed print.

Some embodiments described herein also prevent replaying of biometric prints. Thus, even if another party gains improper access to that biometric print, that user will not be able to use that biometric print to pretend they are the user when using that biometric print to authenticate to the authentication system. In accordance with at least some of those embodiments, this is accomplished by having the one-way processing include chain-hashing.

First, a system that includes a user, a client computing system, and an authentication system will be described with respect to FIG. 1. Then, the enrolling of the biometrics of the user with the authentication system will be described with respect to FIGS. 2, 3 and 4A. Thereafter, matching of biometrics of the user for authenticating the user will be described with respect to FIGS. 5 and 6. Additional examples of one-way processing will then be described with respect to FIGS. 4B, 4C and 4D. Finally, an example computing system that may be the client computing system, and/or the authentication system will be described with respect to FIG. 7.

Figure 1:
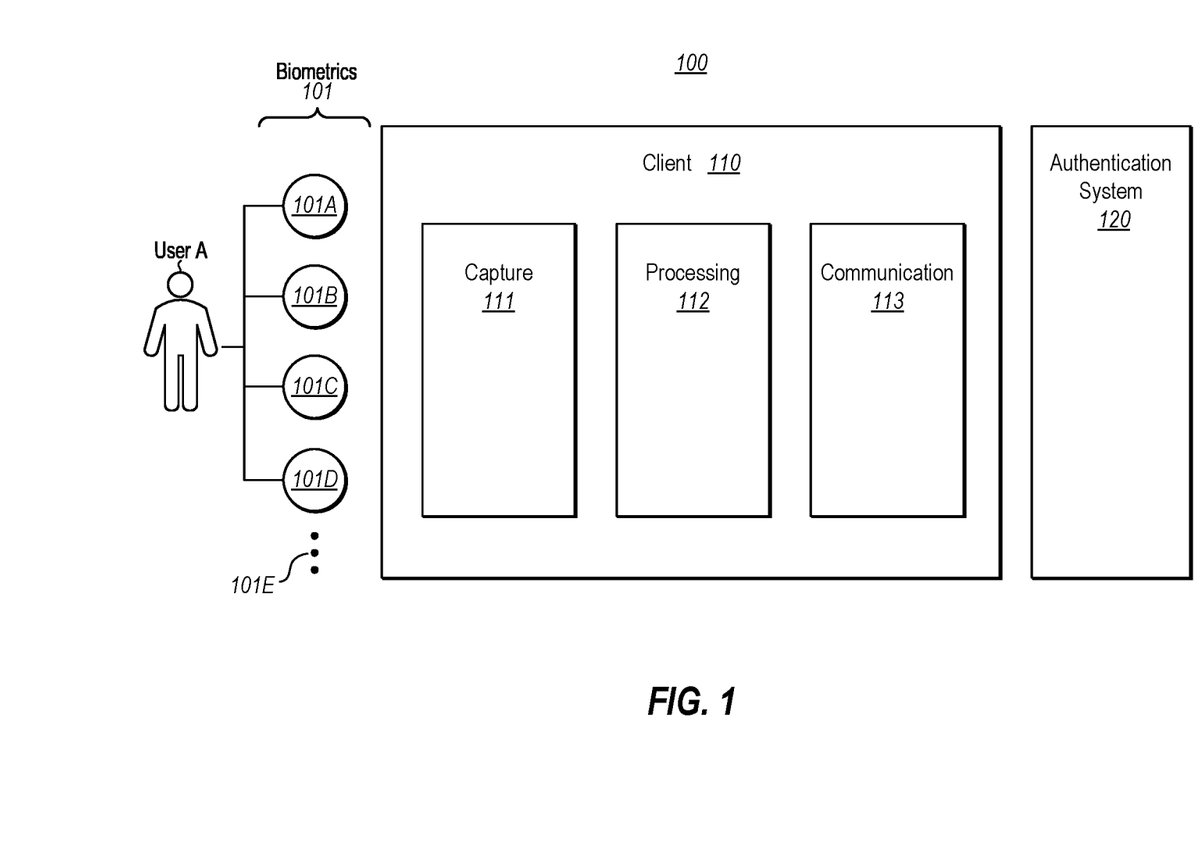
FIG. 1 illustrates a system in which the principles described herein may operate, which includes a user that interacts with a client computing system for purposes of enrolling biometrics with an authentication system, and later matching biometrics for authentication of the user.

FIG. 1 illustrates a system 100 in which the principles described herein may operate. The system 100 includes a user A that interacts with a client computing system 110. The system 100 also includes an authentication system 120. The client computing system 110 and the authentication system 120 may each be structured as described below for the computing system 700 of FIG. 7.

As illustrated in FIG. 1, the user A has biometrics 101. The biometrics are symbolically illustrated as circles. The biometrics 101 may be any measurable physiological feature or combinations of features of the user A that distinguishes the user A from the vast majority of other users. As an example, the biometrics 101 may be fingerprints, facial features, palm vein patterns, hand geometries, iris patterns, retina patterns, and so forth. The biometrics 101 are illustrated as including four biometrics 101A, 101B, 101C and 101D. However, the ellipsis 101E represents that a user 101 has enumerable physiological features that are largely unique to that user, and thus may be used to identify that user.

The client computing system 110 also includes a biometric print capture component 111, a one-way processing component 112, and a communication component 113. These components 111, 112 and 113 may be software and/or hardware components of the client computing system 110. For instance, if the client computing system 110 is structured as described below for the computing system 700 of FIG. 7, each of the biometric print capture component 111, the one-way processing component 112, and the communication component 113 may be structured as described for the executable component 706 of FIG. 7.

The use of biometrics to authenticate includes two phases: an enrollment phase and a later matching phase. In the enrollment phase, a user and his/her biometric data are enrolled in the authentication system. This enrolled biometric data will be used in future matching phases when determining that biometrics are from that same user. In the matching phase, a user uses a current biometric (or more specifically, current biometric data generated from that current biometric) that the authentication system may use to authenticate through matching that current biometric data with the enrolled biometric data.

Figure 2:
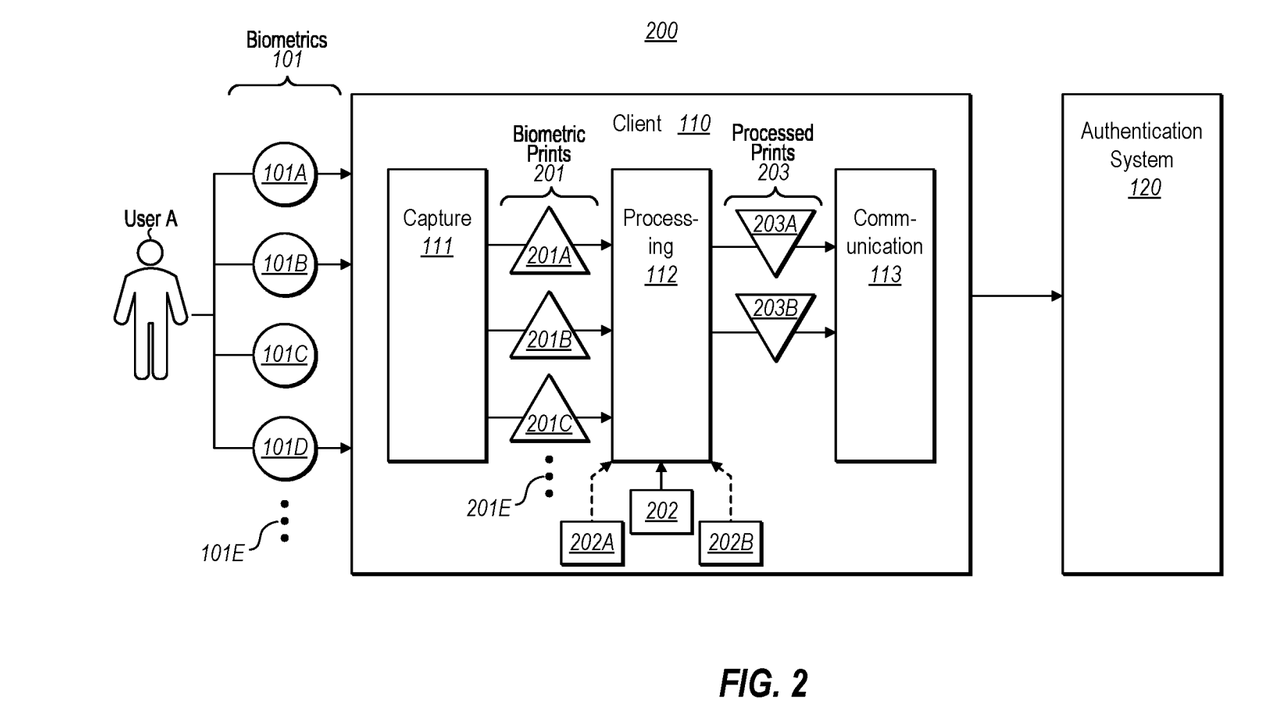
FIG. 2 illustrates a system that is the same as the system of FIG. 1, except that various data flows associated with enrollment are also illustrated.
Figure 3:
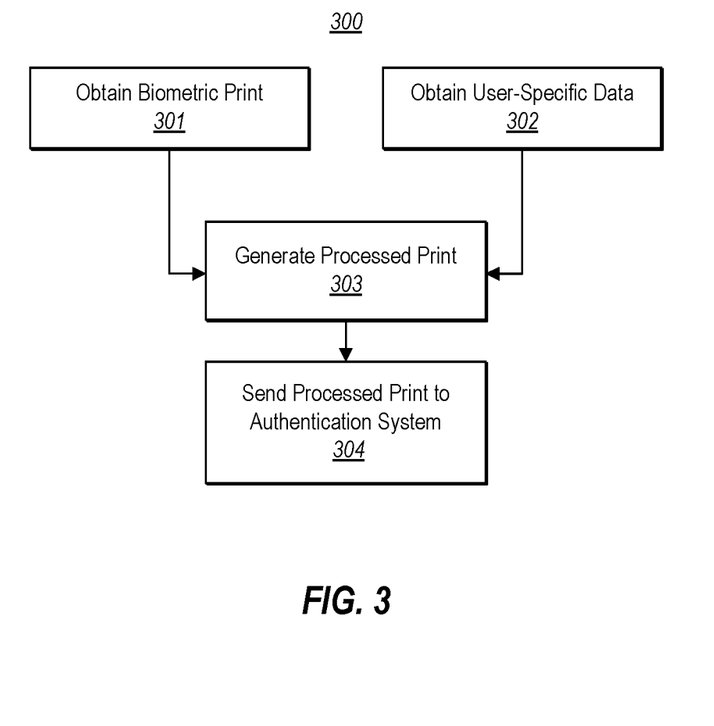
FIG. 3 illustrates a flowchart of a method for enrolling a user so as to enable revocable biometric authentication of the user.

An example enrollment process will now be described with respect to FIGS. 2 and 3. FIG. 2 illustrates a system 200 that is the same as the system 100 of FIG. 1, except that various data flows associated with enrollment are also illustrated. FIG. 3 illustrates a flowchart of a method 300 for enrolling a user so as to enable revocable biometric authentication of the user. The method 300 may be performed for each of multiple biometric prints of the user. The method 300 of FIG. 3 will now be described with frequent reference to the system 200 of FIG. 2.

The method 300 includes obtaining a biometric print of a user (act 301). A biometric print is a computer-readable representation of a biometric of the user. For instance, in FIG. 2, the user A provides some of his/her biometrics 101 (specifically, biometrics 101A, 101B and 101D) to the client computing system 110. The biometric print capture component 111 generates a biometric print 201 for each of the provided biometrics 101A, 101B and 101D. For instance, the biometric print capture component 111 generates biometric print 201A digitally representing the biometric 101A,
biometric print 201B digitally representing the biometric 101B, and biometric print 201D digitally representing the biometric 101D.

The ellipsis 201E represents that the biometric print capture component 111 may generate biometric prints 201 for other biometrics 101 offered by the user A. The lack of a biometric print 201C is simply to explain that the user A has many biometrics, and that not all of those biometrics need be provided. Indeed, the biometric print capture component 111 may not be equipped for capturing all of the user's biometrics. For instance, the biometric print capture component 111 may be a fingerprint reader that may only capture fingerprints. The biometric print capture component 111 may be structured the same as any biometric print capture component, whether now existing, or yet to be developed. The precise structure of the biometric print capture component 111 is not important to the broader principles described herein, and is explained merely for context.

Referring to FIG. 3, unlike conventional biometric systems, the method 300 also includes obtaining user-specific data (act 302) that is, or that corresponds to, user-specific data that is recognized by an authentication system as being associated with the user. For instance, in FIG. 2, the one-way processing component receives user-specific data 202 that is specific to the user A.

Furthermore, method 300 includes generating a processed print by performing one-way processing of the biometric print using the obtained user-specific data (act 303). One-way processing is processing in which the original inputs of the processing cannot be derived from the outputs of the processing. Examples of one-way processing that uses user-specific data to process a biometric print will be described further below with respect to FIGS. 4A through 4D.

For instance, in FIG. 2, the one-way processing component 112 performs one-way processing of at least some of the biometric prints 201 using user-specific data to thereby generate processed prints 203. For instance, the one-way processing component 112 performs one-way processing of the biometric print 201A using the user-specific data 202 to thereby generate a corresponding processed print 203A. Also, the one-way processing component 112 performs one-way processing of the biometric print 201B using the user-specific data 202 to thereby generate a corresponding processed print 203B. This represents an embodiment in which the user-specific data is specific to the user, but may be used for multiple biometric prints of that user. The fact that the biometrics prints 201 are the original biometric prints is represented by each of the biometric prints 201 being an upward-pointing triangle. The fact that the processed prints 203 are processed versions of the biometric print is represented by each of the processed prints 203 being a downward-pointing triangle. The same symbolism is used in FIG. 5 as well.

Figure 4A:
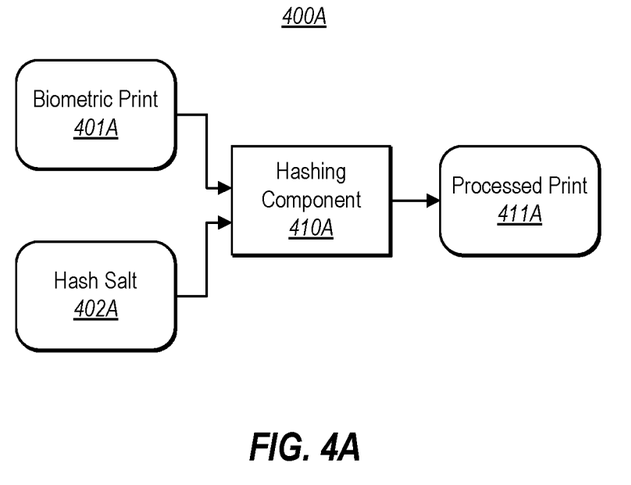
FIG. 4A illustrates a first example in which the user-specific data is a hash salt, and the one-way processing is a single hash operation of the combination of the biometric print and the hash salt.

FIG. 4A illustrates a simple example 400A in which the user-specific data 202 is a hash salt 201A, and the one-way processing is a single hash operation. In FIG. 4A, the combination of the biometric print 401A and the hash salt 402A are provided to a hashing component 410A to generate a processed print 411A. For instance, suppose that the hash salt 402A is $S_{user\ A}$, the biometric print 401A is $p_1$, and the hash function is $h(x)$. In this case, the one-way processing may be defined as $h(p_1, S_{user\ A})$. If this is done for multiple prints $p_1$ to $p_n$, a template or digest ($Template_{user\ A}$) of prints may be defined as follows in Equation 1.

$$Template_{user\ A} = [h(p_1, S_{user\ A}), h(p_2, S_{user\ A}), \ldots h(p_n, S_{user\ A})]. \qquad (1)$$

In the example of Equation 1, the user-specific data is a hash salt of the user, and the one-way processing comprising hashing of the biometric print along with the hash salt (also referred to as salted hashing of the biometric print) of the user resulting in the processed print.

In an alternative embodiment, the user-specific data is also specific to a particular biometric print. For instance, FIG. 2 shows user-specific data 202A that is specific to the user A and also specific to the biometric print 201A, and user-specific data 202B that is specific to the user A and also specific to the biometric print 201B. In this case, the one-way processing component 112 performs one-way processing of the biometric print 201A using the user-specific data 202A to thereby generate the corresponding processed print 203A. Also, the one-way processing component 112 performs one-way processing of the biometric print 201B using the user-specific data 202B to thereby generate a corresponding processed print 203B. Equation 2 illustrates an example of a template in which there are multiple hash salts [$S_{user\ A1}, S_{user\ A2}, \ldots, S_{user\ An}$], each for the same User A, but each corresponding to a different print [$p_1, p_2, \ldots, p_n$] of that user.

$$Template_{user\ A} = [h(p_1, S_{user\ A1}), h(p_2, S_{user\ A2}), \ldots, h(p_n, S_{user\ An})]. \quad (2)$$

The example of FIG. 4A and Equations 1 and 2 will be referred to further herein, although additional examples will later be described with respect to FIGS. 4B through 4D, which will be after the description of matching with respect to FIGS. 5 and 6.

The lack of a processed print 203D is simply to explain that the principles described herein do not require one-way processing of every biometric print 201 captured by the client computing system 110. However, one-way processing indeed be performed on all biometric prints captured by the client computing system, but might also be performed on only some, or perhaps even just one, of the biometric prints captured by the client computing system.

The method 300 then causes the processed print to be provided to the authentication system (act 304). For instance, in FIG. 2, the communication component 113 may provide the processed prints 202 to the authentication system 120. For instance, a digest of multiple processed prints may be provided to the authentication system 120. This digest of processed prints may be used for later authentication of the user A during one or more matching phases.

Recall that the first of two phases associated with biometric identification is the enrollment phase described above with respect to FIGS. 2 and 3. Now the subsequent matching phase will be described with respect to the system 500 of FIG. 5 and the method 600 of FIG. 5. The matching phase may be performed each time the user identifies himself/herself to the authentication system subsequent to the enrollment phase.

Figure 5:
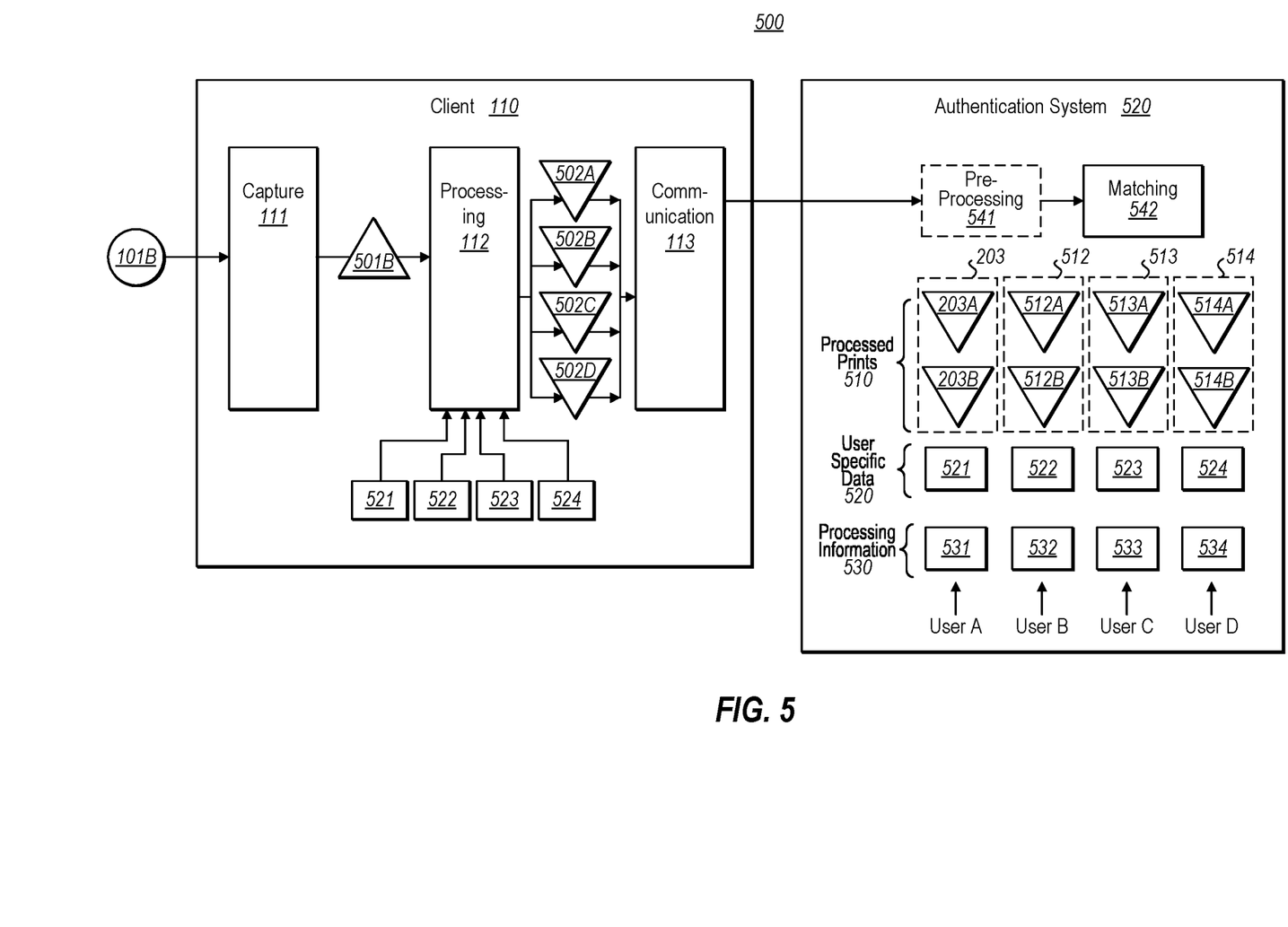
FIG. 5 is a system that similar to the system of FIG. 2, except that now more elements of the authentication system are illustrated, and dataflows associated with matching are also shown.

FIG. 5 is a system 500 that similar to the system 200 of FIG. 2 of FIG. 2, except that now more elements of the authentication system 120 are illustrated in the form of authentication system 520. For instance, depending on the type of one-way processing performed at the client computing system 110, the authentication system 520 may perform additional one-way processing using pre-processing component 541. In addition, the authentication system 520 includes a matching component 542 that performs matching of the received processed print (or the pre-processed processed print) against the enrolled processed prints. When the authentication system 120 is structured as described below for the computing system 700, each of the pre-processing component 541 and matching component 542 may be structured as described below for the executable component 706 of FIG. 7. Furthermore, in FIG. 5, dataflows associated with matching are illustrated, whereas FIG. 2 illustrated dataflows associated with enrollment.

The authentication system 520 includes enrolled processed prints 510 associated with multiple users. For instance, there are processed prints 203A and 203B (i.e., processed prints 203) associated with user A, processed prints 512A and 512B (i.e., processed prints 512) associated with user B, processed prints 513A and 513B (i.e., processed prints 513) associated with user C, and processed prints 514A and 514B (i.e., processed prints 514) associated with user D. In addition, the authentication system 500 has user-specific data 521 through 524 (i.e., user-specific data 520) associated with each of users A through D, respectively. Also, the authentication system 500 perhaps has processing information 531 through 534 (i.e., processing information 530) associated with each of users A through D, respectively. For example purposes only, the authentication system 520 is illustrated as including processed prints 510, user-specific data 520, and processing information associated with only four users A, B, C and D. However, the authentication system may include such data for any number of users.

Figure 6:
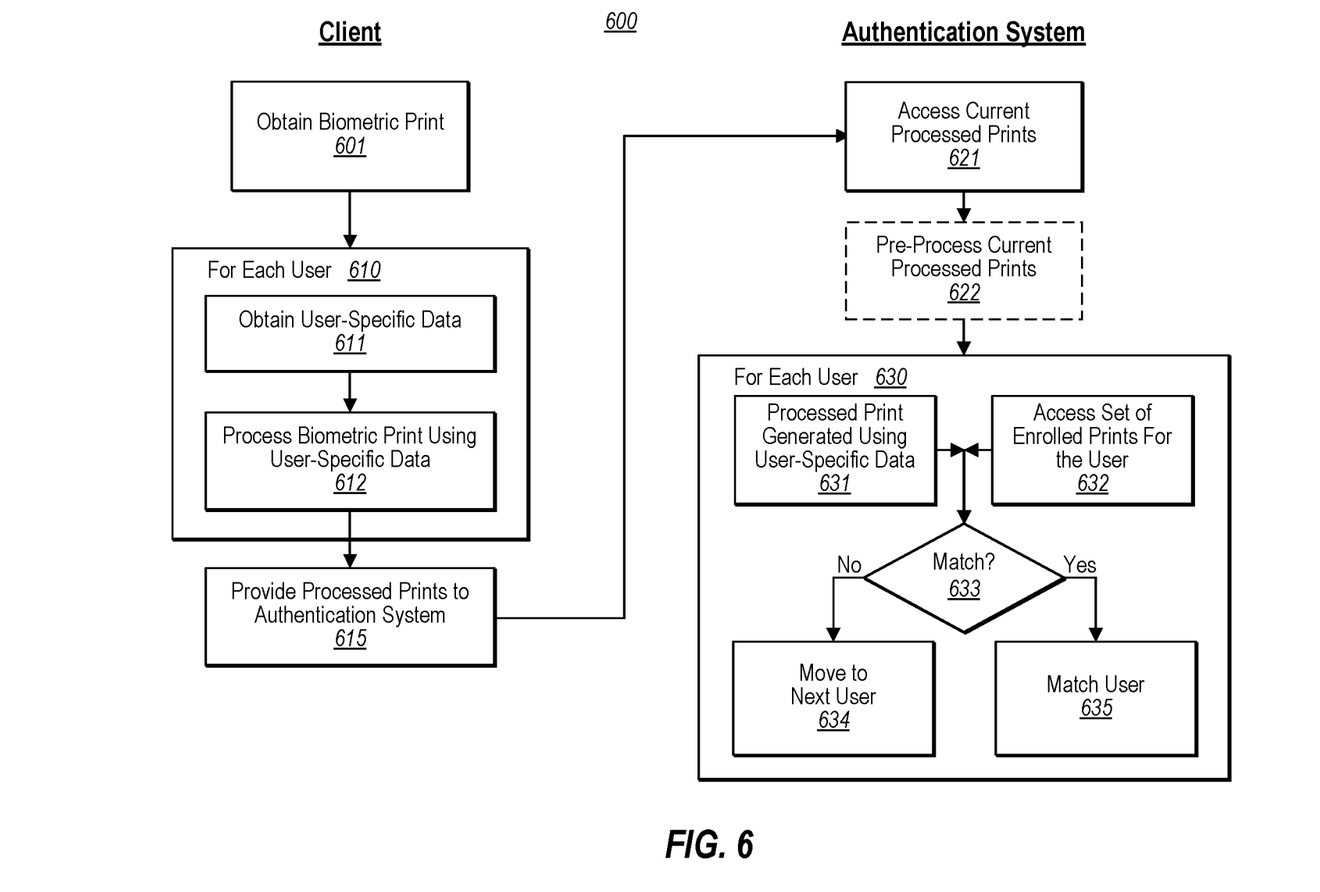
FIG. 6 illustrates a flowchart of a method for identifying the user (matching) to the authentication system after enrolling the user.

FIG. 6 illustrates a flowchart of a method 600 for identifying the user to the authentication system after enrolling the user. The method 600 may be performed in the system 500 of FIG. 5. Accordingly, the method 600 of FIG. 6 will now be described with frequent reference to the system 500 of FIG. 5. Acts that are performed by the client computing system (e.g., client computing system 110 of FIGS. 1, 2 and 5) are represented in the left column of FIG. 6 under the heading "Client". Acts that are performed by the authentication system (e.g., authentication system 120 of FIGS. 1, 2 or authentication system 520 of FIG. 5) are represented in the right column of FIG. 6 under the heading "Authentication System." That said, the computing system that captures the biometric print for purposes of matching need not be the same computing system that captured the multiple biometric prints for purposes of the prior enrollment.

The client computing system obtains a biometric print of the user (act 601). For instance, in FIG. 5, the biometric print capture component 111 captures a biometric 101B of the user A to generate the biometric print 501B. The biometric print 501B is likely the same, or very similar, to the biometric print 201B that was previously captured by the biometric print captured component 111 from the same biometric 101B at the time of enrollment. However, unlike the enrollment phase, perhaps one biometric print is generated from a single biometric. As an example, during enrollment, a user might have enrolled all of his/her fingers. However, when later authenticating during the matching phase, perhaps the user only uses a single finger to authenticate.

Then, rather than generate a single processed print from that single biometric print, multiple processed prints are generated from the single biometric print. Specifically, in FIG. 6, the content of box 610 may be performed for each of multiple users (e.g., for each of users A, B, C and D).

More specifically, user-specific data that is, or that corresponds to, respective user-specific data of users is obtained (act 611). For instance, in FIG. 5, the one-way processing component 112 receives the biometric print 501B, as well as the user-specific data 521 through 524 for each of the users A, B, C and D. The one-way processing component then generates a corresponding processed print for each of those users (act 612) by performing respective one-way processing of the more recent biometric print using the obtained respective user-specific data. The client computing system 110 may obtain the user-specific data 521 through 524 from the authentication system 520.

For instance, suppose the more recently received biometric print 501B is symbolized as $p_{unknown}$ and salt hash for each of the user A through N is defined by the set [$S_{user\ A}$, $S_{user\ B}$, ..., $S_{user\ N}$]. Then, the processed print may be generated by hashing the biometric print 13 unknown against each if the salts. In that case, the set of processed prints would be defined by the following Equation 3.

$$[h(p_{unknown}, S_{user\ A}), h(p_{unknown}, S_{user\ B}), \ldots, h(p_{unknown}, S_{user\ N})]. \quad (3)$$

In the example of FIG. 5, the processed prints includes processed print 502A generated from the biometric print 501B using the user-specific data 521, processed print 502B generated from the biometric print 501B using the user-specific data 522, processed print 502C generated from the biometric print 501B using the user-specific data 523, and processed print 502D generated from the biometric print 501B using the user-specific data 524.

The method 600 then includes causing the processed prints for each of the multiple users to be provided to the authentication system for authentication of the particular user (act 615). For instance, in FIG. 5, the communication component 113 provides the processed prints 502 (including each of the processed prints 502A, 502B, 502C and 502D) to the authentication system 520.

The method 600 then proceeds to the authentication system, which attempts to match the biometrics to identify a particular user. Specifically, the authentication system accesses the current processed prints (act 621). In the case of FIG. 5, the authentication system 520 receives the processed prints 502A through 502D. The authentication system might also perform some pre-processing of the processed prints (act 622). The scenarios in which pre-processing might be beneficial will be described further below with respect to FIGS. 4C and 4D.

The content of box 630 may then be performed for each of the multiple users to determine which of the enrolled users, if any, the recently scanned user is. As part of this process, the authentication system determines that the processed print was generated using was generated using the user-specific data (act 631). In the case of the salt hash, this is implicit when matching user against a matching processed print. After all, if the hash was not generated based on the valid salt hash, then a matching processed print could not be found.

The authentication system also accesses a set of enrolled processed prints for the corresponding user (act 632). The authentication system determines whether there is a match of the current processed print with any of the enrolled processed prints in the set of enrolled processed prints for the corresponding user (decision block 633). If not ("No" in decision block 633), the authentication system checks if there is a match for the next user, or if there are none, fails to identify the user (act 634). If so ("Yes" in decision block 633), the authentication system determines that the corresponding user is identified (act 635).

For instance, in FIG. 5, in the case of there being users A, B, C and D, the authentication system 120 may determine if any of the more recent processed prints 502 match those enrolled processed prints 203A and 203B, 512A and 512B, 513A and 513B, and 514A and 514B. In the salt hash example of Equation 3, the authentication system would determine that $h(p_{unknown}, S_{user\ A})$ is within Template$_{user\ A}$ ("Yes" in decision block 633 when evaluating user A) since $h(p_{unknown}, S_{user\ A})$ $S_{user\ A}$) would match $h(p_2, S_{user\ A})$ (see Equation 1). This same matching allows the authentication system to know that the processed print $h(p_{unknown}, S_{user\ A})$ $S_{user\ A}$) was indeed generated by user A (act 631 when evaluating user A). Thus, determining whether the processed print was indeed generated by user-specific data is performed as part of determining if any of the current processed prints match with any of the enrolled processed prints in the set of enrolled processed prints for the corresponding user.

There is no need to continue to evaluate additional users once the matching user is found (act 635). However, suppose that the processed print $h(p_{unknown}, S_{user\ A})$ had not matched any of the enrolled process prints for user A. In that case, the matching process would move to the next user (act 634), which is user B. Since $h(p_{unknown}, S_{user\ B})$ does not match any of the enrolled prints for user B (since $p_{unknown}$ is not a biometric print for user B), this would result in no match being found ("No" in decision block 633), resulting in the next user (user C) being evaluated (act 634). Since $h(p_{unknown}, S_{user\ C})$ does not match any of the enrolled prints for user C (since $p_{unknown}$ is not a biometric print for user C), this would result in no match being found ("No" in decision block 633), resulting in the final user (user D) being evaluated (act 634). Finally, since $h(p_{unknown}, S_{user\ D})$ does not match any of the enrolled prints for user D (since $p_{unknown}$ is not a biometric print for user D), this would result in no match being found ("No" in decision block 633), resulting in the final user (user D) being evaluated (act 634).

There is perhaps also some final one-way processing of the current processed print (act 622). This may not be the case when the processing performed is performing a single hash of the biometric. However, it may well be the case when the entire one-way processing involves chain-hashing a predetermined number of times. This pre-processing will be further described with respect to FIGS. 4C and 4D below. For now, however, the description continues with a description of FIG. 4B.

Figure 4B:
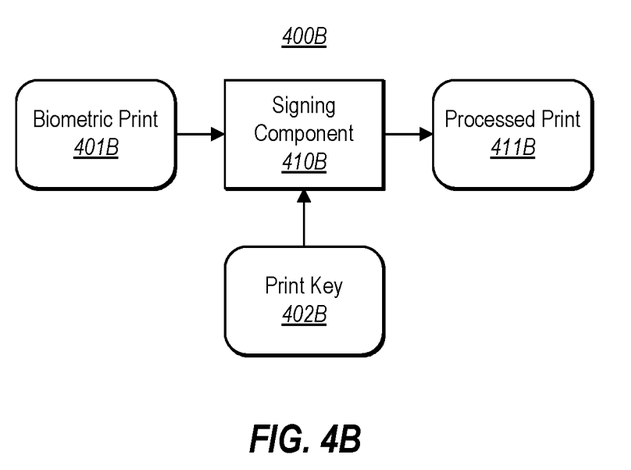
FIG. 4B illustrates a second example in which the user-specific data is a private key of a public/private key pair, and the one-way processing is digitally signing the biometric print using the private key.

FIG. 4B illustrates one-way processing 400B that may be performed by the one-way processing component 112 of FIGS. 1, 2 and 5. In this case, the one-way processing is digitally signing and the user-specific data is a private key of a public/private key pair. The one-way processing includes a signing component 410B digitally signing a biometric print 401B using a private key 402B to generate a processed print 411B in the form of a signed biometric print. In this case, the user-specific data is the private key 402B of a public/private key pair associated with the user. The corresponding public key is the user-specific data that is recognized by the authentication system as being associated with the user. The authentication system 520 may use that public key in order to determine that the processed print 411B was indeed signed by the user (e.g., in act 631). If the authentication system 520 cannot make that determination, then that user is not determined as a match (act 634).

Figure 4C:
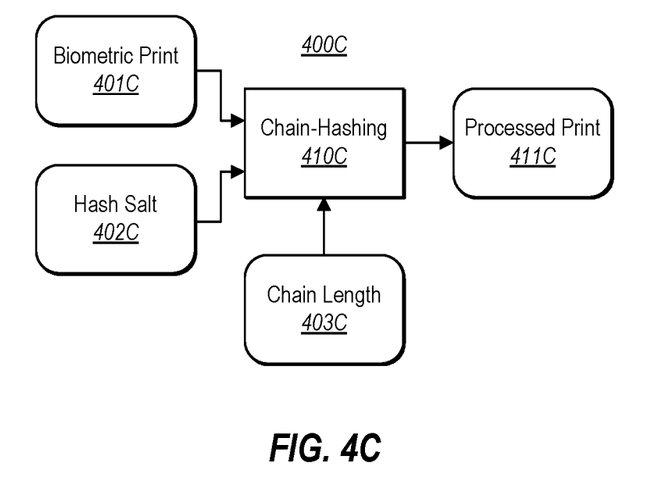
FIG. 4C illustrates a third example in which the user-specific data is a hash salt, and the one-way processing is a chain-hashing operation of the combination of the biometric print and the hash salt.

FIG. 4C illustrates another example 400C of one-way processing of the biometric print. In this case, a chain-hashing component 410C chain-hashes the combination of the biometric print 401C and the salt hash 402C a predetermined number of times according to a chain length 403C. The hash salt 402 may be the user-specific data (e.g., the user-specific data 520). The chain length 403C may be the processing information (e.g., processing information 530). The client computing system 110 may obtain this information from the authentication system 520.

Just like a traditional biometric system, the hashing of a biometric print along with a hash salt can still be compromised if a valid salted hash can be obtained. In other words, is an attacker is able to obtain the salted hash $h(p_x, S_{user\ A})$ for $user_A$, that salted hash can be replayed to the authentication system and would be treated as a valid match. To solve this problem, the processed print (i.e., the salted hash) is rehashed repeatedly a set number of times. This is written as y=fin (x), where y is the nth chain in the hash chain (i.e., $h^n(x)=h(h(h(h(..h(x)))))$).

For instance, assume a piece of data, x, is hashed 100 times resulting in $y=h^{100}(x)$. The authentication system may advertise the hash function it supports, h, and the number of the chain expected, 100. To prove that the user has access to the data, x, the client computing system performs a hash chain on x up until 99 times, providing the authentication system $y'=h^{99}(x)$. Given that hash functions are computationally irreversible, the authentication system knowns that the publicly known $h^{100}(x)$ cannot be used to compute $h^{99}(x)$. So when it accepts y', the system performs a simple test to determine if h(y')=y. If this is true, then the authentication system knows that the client computing system does indeed have access to x and rolls the chain back by one, broadcasting $y'=h^{99}(x)$ as the new chain element. The next attempt to validate x to the authentication system will have to compute the $98^{th}$ hash chain of x and present that to the authentication system.

During enrollment, the authentication system will determine a chain length suitable for the user. In our example we select a chain length of 100. Once a chain is exhausted, the user will re-enroll to continue leveraging the authentication system. To limit user inconvenience and avoid user re-enrollment, the user can be prompted to verify themselves using another mechanism which could boot strap re-chaining of the prints.

For now, we look at the simpler case where enrollment will be required to continue using the system once the chain is exhausted. The authentication system may notify the client computing system of 1) how many times to perform chain-hashing in order to enroll a digest of processed prints (e.g., 100), as well as 2) the hash salt $S_{user\ A}$. This represents an example of the act of obtaining the user-specific data (act 302) of FIG. 3

With a chain length determined, enrollment will be performed as before, but the templates will now be constructed as in the following Equation 4:

$$\text{Template}_{user\ A}=[h^{100}(p_1, S_{user\ A}), h^{100}(p_2, S_{user\ A}), \ldots, h^{100}(p_n, S_{user\ A})]. \quad (4)$$

In this state, each print has a chain length of 100, allowing a particular print to be used up to 100 times before enrollment is needed.

To performing matching, the unknown user's print is hashed as before according to Equation 5 as follows.

$$[h(p_{unknown}, S_{user\ A}), h(p_{unknown}, S_{user\ B}), \ldots, h(p_{unknown}, S_{user\ N})]. \quad (5)$$

Once the digests are ready, matching is changed slightly, in particular take the case where the unknown user is being compared to user A. Using the templates above, $\text{Template}_{user\ A}=[h^{100}(p_1, S_{user\ A}), h^{100}(p_2, S_{user\ A}), \ldots, h^{100}(p_n, S_{user\ A})]$, the client computing system will note that each print digest is chained up to 100, so the client computing system will generate the $99^{th}$ chain using $h(p_{unknown}, S_{user\ A})$ resulting in $h^{99}(p_{unknown}, S_{user\ A})$ This is an example of the one-way processing performed in act 612 in FIG. 6. The salted chain-hash $h^{99}(p_{unknown}, S_{user\ A})$ is then provided to the authentication system, which hashes this result one more time, resulting in salted hash $h^{100}(p_{unknown}, S_{user\ A})$.

The system then compares this new, chained digest to each digest in $\text{Template}_{user\ A}$. For the purpose of this example, let us assume the unknown user's processed print matches with the $3^{rd}$ print digest in the template. At this point, the system validates the unknown user's identity to be user A. Since the chain-salted hash $h^{99}(p_{unknown}, S_{user\ A})$ was sent over a network, to be safe, it is assumed that this chain-salted hash could have been obtained by an unauthorized user. To prevent replaying of $h^{99}(p_{unknown}, S_{user\ A})$, the authentication system then rolls back chain-length for user A's by one resulting in a template being as defined in the following Equation 6.

$$\text{Template}_{user\ A}=[h^{99}(p_1, S_{user\ A}), h^{99}(p_2, S_{user\ A}), h^{99}(p_3, S_{user\ A}), \ldots, h^{99}(p_n, S_{user\ A})] \quad (6)$$

At this point, the system is ready to use this template again. The next time, however, the authentication system instructs that chain-hashed prints for chain lengths 98 be provided. Suppose the user then provides a new unknown biometric print $p_{new1}$. The client computing system when then provide the chain-hashed salts $h^{98}(p_{new1}, S_{user\ A})$.

More generally speaking, the authentication system keeps track of the number of links to be performed in the one-way processing on a per-user basis, and decrements the number of links for a user when the user is successfully authenticated. This allows the authentication system to instruct the client computing system on what one-way processing to perform for which user.

For instance, for purposes of example only, assume that the current chain length for user A is 99, the current chain length for user B is 82, the current chain length for user C was 90, and the current chain length for user D is 15. In that case, the client computing system would provide sixteen different processed prints to the authentication system 4 for user A (one of chain length 14, one of chain length 81, one of chain length 89, and one of chain length 98), 4 for user B (again with chain lengths 14, 81, 89 and 98), 4 for user C (with the same 4 chain lengths), and 4 for user D (with the same chain lengths).

Now, suppose the user A was identified for one authentication. The current chain length for user A would decrement from 99 to 98. The current change length for user B would remain at 82, the current chain length for user C would remain at 90, and the current chain length for user D would remain at 15. At the next authentication, the client computing system would still provide sixteen different processed prints to the authentication system 4 for user A (one of chain length 14, one of chain length 81, one of chain length 89, and one of chain length 97), 4 for user B (again with chain lengths 14, 81, 89 and 97), 4 for user C (with the same 4 chain lengths), and 4 for user D (with the same chain lengths). If user D was authenticated, then the current chain length for user D would be decremented to 14.

In another example, the chain length is specific to the user and the processed print. For instance, consider again the case where the user A's template is as follows:

$$\text{Template}_{user\ A}=[h^{100}(p_1, S_{user\ A}), h^{100}(p_2, S_{user\ A}), \ldots, h^{100}(p_n, S_{user\ A})] \quad (7)$$

Using the templates above, the system will notes that each print digest is chained up to 100, so it will generate the $99^{th}$ chain using $h(p_{unknown}, S_{user\ A})$ resulting in $h^{100}(p_{unknown}, S_{user\ A})$. The system then compares this new, chained digest to each digest in $\text{Template}_{user\ A}$. For the purpose of this example, let's assume the unknown user's print matches with the $3^{rd}$ print digest in the template.

At this point, the system has validates the unknown user's identity to be user A. It then rolls back the third digest by one resulting in user A's template being $$Template_{user\ A} = [h^{100}(p_1, S_{user\ A}), h^{100}(p_2, S_{user\ A}), h^{99}(p_3, S_{user\ A}), \ldots, h^{100}(p_n, S_{user\ A})]$$

In the situation where a particular print chain has been exhausted, the system will simply require the user to perform the same process as detailed for revoking the chained template. This requires the user to prove who they are again and the follow it up with recapture of biometric data to create a new template for them. This template will have a set of new, fully chained prints ready to be used for matching again.

Although less secure than the re-enrollment case, the system can opt for a more user friendly approach to re-chaining a print as detailed below Assume the user's print is in this state $$Template_{user\ A} = [h^{100}(p_1, S_{user\ A}), h^{100}(p_2, S_{user\ A}), h^{2}(p_3, S_{user\ A}), \ldots, h^{100}(p_n, S_{user\ A})]$$

You will notice that the third chained print is about to be exhausted. The system has just validated the user but the chain cannot be rolled any further. In this case, the system will use a modified solution which leverages per-print-seeds. Therefore a templates would actually be designed as follows $$Template_{user\ A} = [h^{100}(p_1, S^1_{user\ A}), h^{100}(p_2, S^2_{user\ A}), h^{2}(p_3, S^3_{user\ A}), \ldots, h^{100}(p_n, S^n_{user\ A})]$$

where $S^n_{user\ A}$ is the seed for user A's $n^{th}$ print.

By adopting this model, we can now re-chain just the third print as it gets exhausted by leveraging a new $3^{rd}$ print seed, namely $S^{3'}_{user\ A}$. As such the new user template after re-chaining is $$Template_{user\ A} = [h^{100}(p_1, S^1_{user\ A}), h^{100}(p_2, S^2_{user\ A}), h^{100}(p_3, S^{3'}_{user\ A}), \ldots, h^{100}(p_n, S^n_{user\ A})]$$

This solution would allow for an effective user experience and allow for targeted revocation of prints rather than templates, allow for only compromised prints to be revoked and for an effortless re-chaining of a print in the template without an enrollment.

Figure 4D:
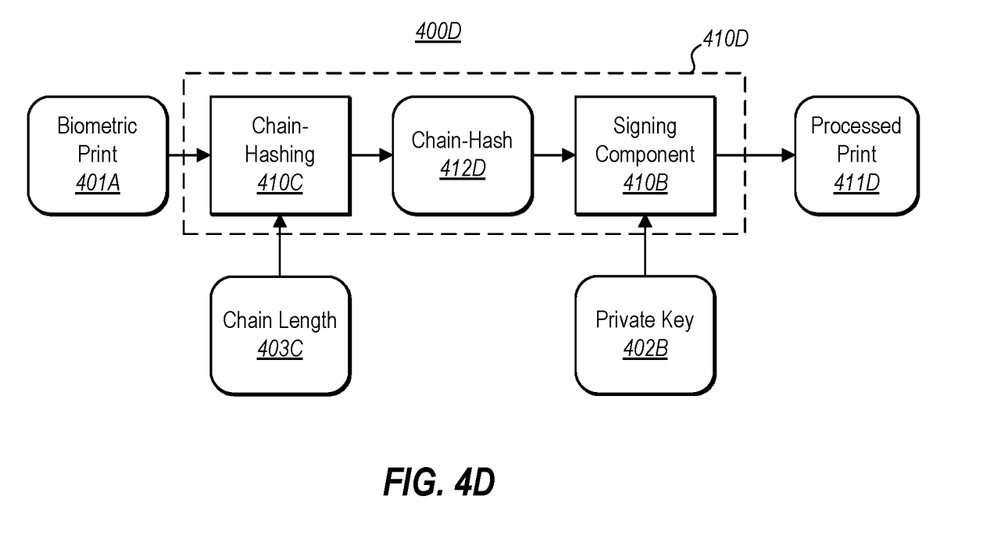
FIG. 4D illustrates a fourth example in which the user-specific data is a private key, and the one-way processing a chain-hashing operation on the biometric print followed by a digital signing of the result using the private key.

FIG. 4D illustrates a final example 400D in which the one-way processing 410D comprises chain-hashing 410C the biometric print 401A up to the chain length 403C, followed by signing 410B the chain-hash 412D using the private key 402B to generate the processed print 411D.

In each of the above, note that revocation of a processed print may be performed by simply informing the authentication system that the user-specific data is no longer valid. This results in the authentication system (at act 631) determining that the user-specific data is no longer valid, and thus that the processed print generated from that user-specific data does not match to the user. For instance, in FIGS. 4A and 4C, the hash salt may be invalidated. In FIGS. 4B and 4D, the public key may be invalidated.

Because the principles described herein operate in the context of a computing system, a computing system will be described with respect to FIG. 7. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
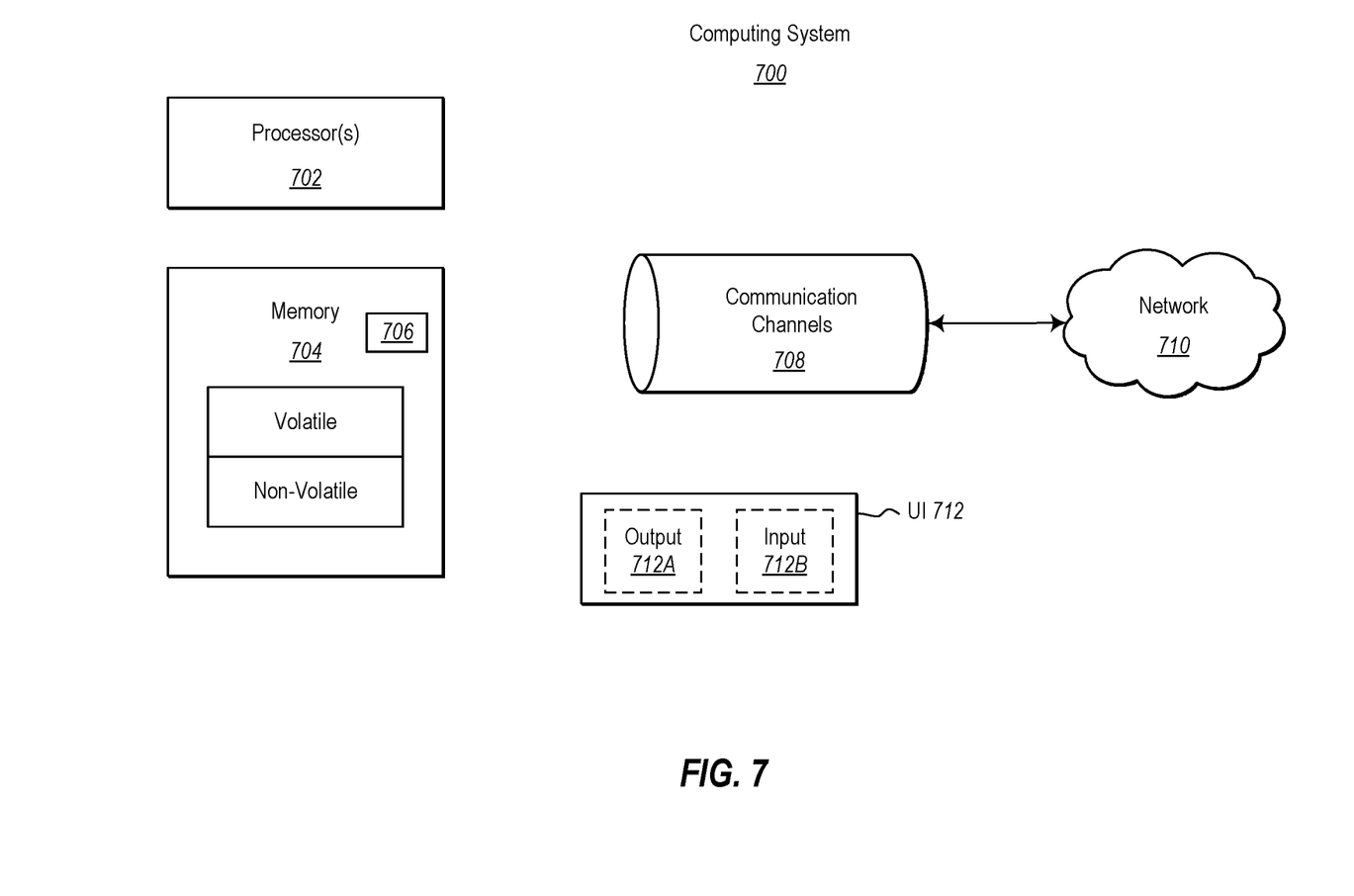
FIG. 7 illustrates an example computer system in which the principles described herein may be employed.

As illustrated in FIG. 7, in its most basic configuration, a computing system 700 typically includes at least one hardware processing unit 702 and memory 704. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface 712 for use in interfacing with a user. The user interface 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, virtual reality, and so forth. Examples of input mechanisms 712B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage media having thereon computer-execution instructions that are structured such that, when executed by the one or more processors, the computing system is configured to enroll a user so as to enable revocable biometric authentication of the user by:
obtaining a biometric print of a user, the biometric print being a computer-readable representation of a biometric of the user;
obtaining user-specific data that is, or that corresponds to, user-specific data that is recognized by an authentication system as being associated with the user, and that is in addition to the biometric print;
generating a processed print by performing one-way processing of the biometric print using the obtained user-specific data, the one-way processing including chain hashing; and
causing the processed print, but not the biometric print, to be provided to the authentication system for later authentication of the user using the processed print and the user-specific data that is recognized by the authentication system as being associated with the user, invalidating the user-specific data at the authentication system resulting in the authentication system no longer being able to authenticate the user based on the processed print, authentication of the user using the processed print resulting in the authentication system rolling back the chain of the chain hashing.

2. The computing system in accordance with claim 1, the user-specific data being a hash salt of the user, the one-way processing comprising hashing of the biometric print along with the salt hash of the user resulting in the processed print.

3. The computing system in accordance with claim 1, the user-specific data being a hash salt of the user, the one-way processing comprising chain-hashing of the biometric print along with the salt hash of the user resulting in the processed print.

4. The computing system in accordance with claim 1, the obtained user-specific data being a private key of a public/private key pair associated with the user, the user-specific data that is recognized by an authentication system as being associated with the user being a public key of the public/private key pair, the one-way processing comprising digitally signing the biometric print using the private key resulting in the processed print.

5. The computing system in accordance with claim 1, the obtained user-specific data being a private key of a public/private key pair associated with the user, the user-specific data that is recognized by an authentication system as being associated with the user being a public key of the public/private key pair, the one-way processing comprising chain-hashing the biometric print and digitally signing the chain-hashed biometric print with the private key resulting in the processed print.

6. The computing system in accordance with claim 1, the biometric print being a particular biometric print, the processed print being a particular processed print, the method further comprising:
obtaining a plurality of other biometric prints of the user;
for each of the plurality of other biometric prints of the user, performing the following:
obtaining respective user-specific data that is, or that corresponds to, respective user-specific data that is recognized by the authentication system as being associated with the user, and that is in addition to the corresponding biometric print;
generating a corresponding processed print by performing corresponding one-way processing of the corresponding biometric print using the obtained respective user-specific data; and
causing the corresponding processed print, but not the corresponding biometric print, to be provided to the authentication system for later authentication of the user using the corresponding processed print and the respective user-specific data that is recognized by the authentication system as being associated with the user, wherein invalidating the respective user-specific data at the authentication system results in the authentication system no longer being able to authenticate the user based on the corresponding processed print.

7. The computing system in accordance with claim 6, the obtained user-specific data being the same for each of the particular biometric print and the plurality of other biometric prints.

8. The computing system in accordance with claim 6, the obtained user-specific data of the particular biometric print being different than the obtained user-specific data for at least some of the plurality of other biometric prints.

9. The computing system in accordance with claim 8, the obtained user-specific data being a hash salt, the hash salt for the particular biometric print being different than the hash salt for at least some of the plurality of other biometric prints.

10. The computing system in accordance with claim 6, the one-way processing algorithm for the particular biometric print being different than one-way processing algorithm for at least some of the plurality of other biometric prints.

11. The computing system in accordance with claim 10, the one-way processing algorithm being a chain-hash, the number of links of the chain-hash for the particular biometric print being different than the number of links of the chain-hash for at least some of the plurality of other biometric prints.

12. A method for enrolling a user so as to enable revocable biometric authentication of the user, the method comprising:
obtaining a biometric print of a user, the biometric print being a computer-readable representation of a biometric of the user;
obtaining user-specific data that is, or that corresponds to, user-specific data that is recognized by an authentication system as being associated with the user, and that is in addition to the biometric print;

generating a processed print by performing one-way processing of the biometric print using the obtained user-specific data, the one-way processing including chain hashing; and causing the processed print, but not the biometric print, to be provided to the authentication system for later authentication of the user using the processed print and the user-specific data that is recognized by the authentication system as being associated with the user, wherein invalidating the user-specific data at the authentication system results in the authentication system no longer being able to authenticate the user based on the processed print, authentication of the user using the processed print resulting in the authentication system rolling back the chain of the chain hashing.

13. The method in accordance with claim 12, the method being further for identifying the user to the authentication system after enrolling the user, the user being a particular user, the method further comprising:

obtaining a more recent biometric print of the particular user, the more recent biometric print being a computer-readable representation of a more recent biometric of the user;

for each of multiple users including the particular user, performing the following:

obtaining respective user-specific data that is, or that corresponds to, respective user-specific data that is recognized by the authentication system as being associated with the corresponding user; and generating a corresponding processed print by performing respective one-way processing of the more recent biometric print using the obtained respective user-specific data; and causing the processed prints for each of the multiple users to be provided to the authentication system for authentication of the particular user.

14. The method in accordance with claim 13, further comprising:

issuing an instruction for the authentication system to revoke the enrollment thereby causing the authentication system to invalidate the user-specific data such that any processed prints based on the user-specific data are no longer usable to identify the user.

15. The method in accordance with claim 12, for each of the plurality of users, the respective one-way processing comprises chain-hashing of the biometric print along with the salt hash of the user resulting in the processed print, the chain-hashing being performed a number of times instructed by the authentication system, the number of times being specific to the user, and being decremented each time the corresponding user successfully authenticates to the authentication system.

16. A method for using matching biometrics to identify a particular user, the method comprising, accessing a current processed print that results from performing a one-way processing of a biometric print of a user using user-specific data, the biometric print being a computer-readable representation of a biometric of the user;

for each of a plurality of users including the particular user, accessing a set of enrolled processed prints for the corresponding user, the processed prints formed by chain hashing of at least a biometric print of the particular user;

determining whether there is a match of the current processed print with any of the enrolled processed prints in the set of enrolled processed prints for the corresponding user; and if there is a match, identifying the particular user as being the corresponding user; and rolling back the chain hashing of the at least one biometric print of the particular user.

17. The method in accordance with claim 16, the accessing of the current processed print being performed as part of accessing a plurality of current processed prints, each of the plurality of current processed prints resulting from performing a different one-way processing of the biometric print of a user using user-specific data, the biometric print being a computer-readable representation of a biometric of the user;

wherein determining whether there is a match is performed as part of determining if any of the plurality of current processed prints match with any of the enrolled processed prints in the set of enrolled processed prints for the corresponding user.

18. The method in accordance with claim 17, wherein the different one-way processings of the biometric print all involve chain-hashing of at least the biometric print, but at least some of the one-way processings being different in the number of links in the chain-hashing.

19. The method in accordance with claim 18, wherein the authentication system keeps track of the number of links to be performed in the one-way processing on a per user basis, a decrements the number of links for a user when the user is successfully authenticated.

20. The method in accordance with claim 18, wherein the authentication system keeps track of the number of links to be performed in the one-way processing on a per user processed print basis, a decrements the number of links for a processed print for a user when the print is used to authenticate that user.

* * * * *